US011488207B2

(12) United States Patent
Adoni et al.

(10) Patent No.: US 11,488,207 B2
(45) Date of Patent: *Nov. 1, 2022

(54) SALES ASSISTANCE BASED ON PURCHASING PREDICTION (71) Applicant: International Business Machines Corporation, Armonk, NY (US)

(72) Inventors: Siddique M. Adoni, Bangalore (IN); Dhandapani Shanmugam, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/578,467

(22) Filed: Sep. 23, 2019

(65) Prior Publication Data

US 2020/0019991 A1 Jan. 16, 2020

Related U.S. Application Data (63) Continuation of application No. 14/687,275, filed on Apr. 15, 2015, now Pat. No. 10,482,505, which is a
(Continued)

(51) Int. Cl.
*G06Q 30/00* (2012.01)
*G06Q 30/02* (2012.01)
(Continued)

(52) U.S. Cl.
CPC ..... *G06Q 30/0261* (2013.01); *G06Q 30/0613* (2013.01); *G06Q 30/0623* (2013.01); *G06Q 30/0639* (2013.01)

(58) Field of Classification Search
CPC .......... G06Q 30/0261; G06Q 30/0613; G06Q 30/0623; G06Q 30/0639
See application file for complete search history.

(56) References Cited

U.S. PATENT DOCUMENTS 6,434,530 B1 8/2002 Sloane
7,658,327 B2 2/2010 Tuchman
(Continued)

FOREIGN PATENT DOCUMENTS

EP 2765551 A1 * 8/2014 ......... G06F 16/2291
WO 2010141656 A1 12/2010
WO 2011047041 A1 4/2011

OTHER PUBLICATIONS

"PocketLens: Toward a Personal Recommender System". (Year: 2004).*

(Continued)

*Primary Examiner* — Maria V Vanderhorst
(74) *Attorney, Agent, or Firm* — David K. Mattheis; Maeve Carpenter (57) ABSTRACT The method includes receiving a location of a client device and one or more items of interest to a user of the client device. The method further includes determining that the location of the client device is within a threshold distance of an item of the one or more items of interest. The method further includes generating a communication with the user of the client device. The method further includes receiving a response from the user of the client device. The method further includes determining if the received response indicates an intent to purchase the item. In one embodiment, the method further includes identifying a sales representative to assist the user of the client device, responsive to determining that the received response indicates an intent to purchase the item.

20 Claims, 3 Drawing Sheets

Related U.S. Application Data continuation of application No. 14/538,989, filed on Nov. 12, 2014, now Pat. No. 10,460,351.

(51) Int. Cl.
*G06Q 30/06* (2012.01)
*G05B 19/418* (2006.01)

(56) References Cited

U.S. PATENT DOCUMENTS

| | | | |
|---|---|---|---|
| 8,359,227 B2 | 1/2013 | Wan | |
| 8,489,112 B2* | 7/2013 | Roeding | G06Q 30/00 |
| | | | 455/456.1 |
| 10,002,375 B1* | 6/2018 | Scythes | G06Q 30/0623 |
| 2001/0032127 A1* | 10/2001 | Lewis | G06Q 30/0252 |
| | | | 705/14.5 |
| 2005/0270160 A1* | 12/2005 | Chan | G06Q 10/087 |
| | | | 340/572.8 |
| 2007/0080930 A1 | 4/2007 | Logan | |
| 2007/0138268 A1 | 6/2007 | Tuchman | |
| 2012/0096490 A1* | 4/2012 | Barnes, Jr. | H04W 4/02 |
| | | | 725/34 |
| 2012/0166308 A1* | 6/2012 | Ahmed | G06Q 20/12 |
| | | | 705/26.41 |
| 2012/0226586 A1 | 9/2012 | Paul | |
| 2012/0303561 A1 | 11/2012 | Sathish | |
| 2013/0110520 A1 | 5/2013 | Cheyer | |
| 2013/0268316 A1 | 10/2013 | Moock | |
| 2013/0275164 A1* | 10/2013 | Gruber | G10L 17/22 |
| | | | 705/5 |
| 2013/0311323 A1 | 11/2013 | Nathan | |
| 2013/0311324 A1 | 11/2013 | Nathan | |
| 2014/0089092 A1 | 3/2014 | Kilmer | |
| 2014/0201025 A1 | 7/2014 | Adoni | |
| 2014/0201026 A1 | 7/2014 | Adoni | |
| 2014/0358722 A1 | 12/2014 | Thiele | |
| 2015/0170248 A1 | 6/2015 | Chung | |
| 2015/0356667 A1* | 12/2015 | Poole | G06Q 30/0635 |
| | | | 705/26.81 |
| 2016/0132928 A1 | 5/2016 | Adoni | |
| 2018/0315110 A1* | 11/2018 | Kannan | G06Q 30/0635 |

OTHER PUBLICATIONS

"A small domain communications system for personalized shopping assistance". IEEE. 1994. (Year: 1994).*

"Method by which information is shared given a time, date, or location to enhance historical significance of web based content". ip.com. 2014. (Year: 2014).*

"Location Aware Question Answering Based Product Searching in Mobile Handheld Devices". IEEE. 2010. In (Year: 2010).*

"A small domain communications system for personalized shopping assistance" Asthana, A. 1994 (Year: 1994).

"A universal information appliance". K. F. Eustice. 1999. (Year: 1999).

"Location Aware Question Answering Based Product Search in Mobile Handheld Devices", (Year: 2010).

"RFID Systems for Enhanced Shopping Experiences". Walter Reade. 2003 (Year: 2003).

List of IBM Patents or Patent Applications Treated as Related (Appendix P), filed herewith.

U.S. Appl. No. 13/781,006, filed Feb. 28, 2013.
U.S. Appl. No. 14/023,842, filed Sep. 11, 2013.
U.S. Appl. No. 14/538,989, filed Nov. 12, 2014.
U.S. Appl. No. 14/687,275, filed Apr. 15, 2015.
U.S. Appl. No. 61/751,587, filed Jan. 11, 2013.

Wasinger et al., "The Anthropomorphized Product Shelf: Symmetric Multimodal Human-Environment Interaction", In: Aarts, E. Encamacao, J. (eds.(: True Visions: The Emergence of Ambient Intellegence. Heidelberg, Berlin, New York, Springer, Feb. 2006. <http:www.dfki.de/~wahlster/Publications/The_Anthropormophized_Product_Shelf.pdf>.

* cited by examiner

SALES ASSISTANCE BASED ON PURCHASING PREDICTION

BACKGROUND OF THE INVENTION

The present invention relates generally to data processing, and more particularly to two way communication between an electronic device and a human.

A number of diverse methodologies outlining techniques for human—computer interactions have emerged since the rise of the field in the 1980s. Most design methodologies stem from a model for how users, designers, and technical systems interact. Early methodologies, for example, treated users' cognitive processes as predictable and quantifiable and encouraged design practitioners to look to cognitive science results in areas such as memory and attention when designing user interfaces. Modern models tend to focus on a constant feedback and conversation between users, designers, and engineers and push for technical systems to be wrapped around the types of experiences users want to have, rather than wrapping user experience around a completed system.

SUMMARY

Embodiments of the present invention disclose a method, computer program product, and system for managing responses in a communication with a user. In one embodiment, in accordance with the present invention, the computer-implemented method includes receiving a location of a client device and one or more items of interest to a user of the client device. The method further includes determining that the location of the client device is within a threshold distance of an item of the one or more items of interest. The method further includes generating a communication with the user of the client device. The method further includes receiving a response from the user of the client device. The method further includes determining if the received response indicates an intent to purchase the item. In one embodiment, the method further includes identifying a sales representative to assist the user of the client device, responsive to determining that the received response indicates an intent to purchase the item.

DETAILED DESCRIPTION

Implementation of embodiments of the invention may take a variety of forms, and exemplary implementation details are discussed subsequently with reference to the Figures.

Figure 1:
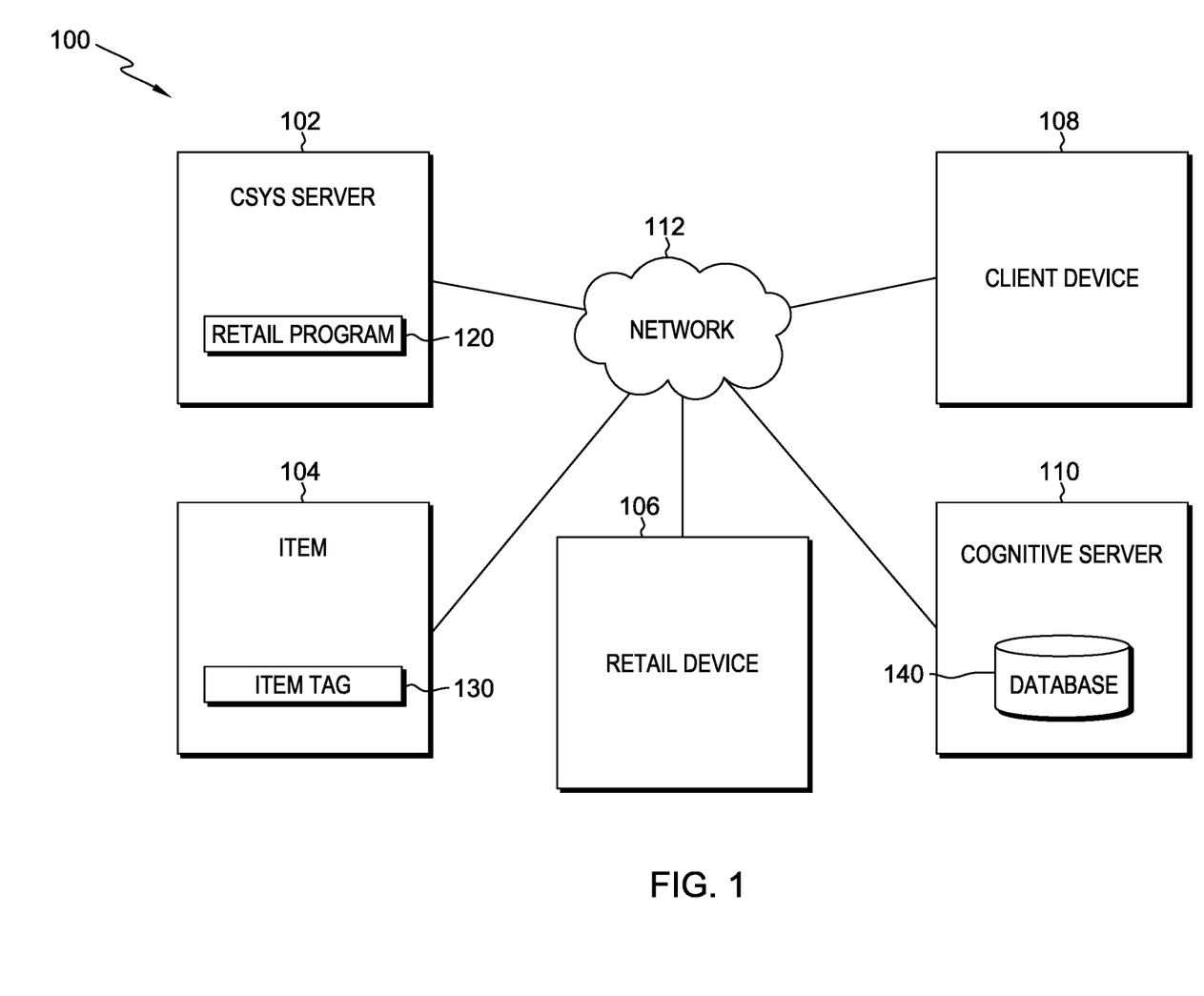
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes Centralized System (Csys) server 102, item 104, retail device 106, client device 108, and cognitive server 110, all interconnected over network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, Csys server 102 is one or more of a management server, a web server, or any other electronic device or computing system capable of receiving, analyzing, and sending data. In this embodiment, Csys server 102 determines the likelihood of a customer purchasing an item via a two way conversation with the user of client device 108 (e.g., the customer) and item tag 130, and determining an appropriate sales representative to assist in the completion of the purchase. In other embodiments, Csys server 102 represents a server computing system utilizing multiple computers as a server system, such as in a cloud computing environment. In another embodiment, Csys server 102 represents a laptop computer, a tablet computer, a netbook computer, a personal computer (PC), a desktop computer, a personal digital assistant (PDA), a smart phone, or any programmable electronic device capable of communicating with item 104, retail device 106, client device 108, and cognitive server 110 via network 112. In another embodiment, Csys server 102 represents a computing system utilizing clustered computers and components to act as a single pool of seamless resources. In an embodiment, Csys server 102 may have cognitive abilities that enable Csys server 102 to understand a voice signal, facial emotions, etc., and generate responses to the voice signal. For example, Csys server 102 may have natural language processing abilities, keyword recognition, or other methods known in the art that enable Csys server 102 to understand audio data. Csys server 102 may also utilize facial recognition to determine the attitude of a person. Csys server 102 includes retail program 120.

In depicted distributed data processing environment 100, retail program 120 resides on Csys server 102 and determines the likelihood of a customer purchase of an item via a two way communication with the user of client device 108 and item tag 130, and determines an appropriate sales representative to assist in the completion of the purchase of the item. In one embodiment, retail program 120 receives audio transmissions from an item tag, such as item tag 130, and sends the audio transmission to cognitive server 110 to create responses. Retail program 120 then receives the generated response from cognitive server 110 and sends the response to item tag 130. In another embodiment, retail program 120 receives the audio transmission from an item tag, and using natural language processing and cognitive computing, creates a response to the audio transmission without sending the audio transmission to cognitive server 110. Retail program 120 also determines the appropriate sales representative to finalize the sale of an item, such as item 104, by utilizing database 140 to gather information, such as the language the user is speaking and available sales representatives that can speak the same language. In another embodiment, retail program 120 may utilize the sales representative's skill set stored in database 140 to determine the appropriate sales representative. Retail program 120 is depicted and described in further detail with respect to FIG. 2.

In the depicted embodiment, item 104 can be any object that is capable of having an item tag (e.g., item tag 130) located on the object (e.g., television, washing machine, camera, or book). In this embodiment, item tag 130 comprises a tag that is a hardware device mounted on a product to store data associated with the product and customer preferences. Item tags, such as item tag 130, are in communication with Csys server 102 via a communication technology, e.g., network 112, a wired TCP/IP, or wireless connection communication or other wireless communications protocols. Item tags, such as item tag 130, are capable of two way communication with a person within a threshold proximity of the item tag via any methods of two way communication known in the art, such as touch screen, audio communication via speakers and microphone, etc. In one embodiment, if an item already contains speakers and a microphone, then item tag 130 may be able to sync with the item and utilize the item's speakers, microphone, visual display, etc. In an example, item tag 130 may be able to connect with a laptop that is on display; in this case, item tag 130 would utilize the speakers, microphone, video camera, and display screen to communicate with the user of client device 108.

In the depicted embodiment, retail device 106 is one or more of a desktop computer, a laptop computer, a tablet computer, a specialized computer server, a smart phone, or any programmable electronic device capable of communicating with Csys Server 102 via network 112 and with various components and devices within distributed data processing environment 100. In general, retail device 106 represents any programmable electronic device, or combination of programmable electronic devices, capable of executing machine readable program instructions and communicating with other computing devices via a network, such as network 112. In an embodiment, retail device 106 receives information, such as which sales representative is assigned to complete the sale of an item (e.g., item 104), from Csys server 102 via network 112. In an example, retail device 106 alerts a sales representative, or other store personnel, with information pertaining to a possible sale of an item located in the store. The alert may be a phone call, text message, computer message, email, intra-store headset message, or any other alert known in the art. The alert may comprise information regarding location, customer name, item of interest, negotiated price, etc.

In the depicted embodiment, client device 108 is one or more of a desktop computer, a laptop computer, a tablet computer, a specialized computer server, a smart phone, or any programmable electronic device capable of communicating with Csys Server 102 via network 112 and with various components and devices within distributed data processing environment 100. In general, client device 108 represents any programmable electronic device, or combination of programmable electronic devices, capable of executing machine readable program instructions and communicating with other computing devices via a network, such as network 112. In an embodiment, client device 108 sends information about a user of client device 108 and/or the preferences of the user of client device 108 to Csys server 102. In another embodiment, client device 108 may have an application which logs information pertaining to items, or items that the user of client device 108 is interested in purchasing (e.g., item 104). In an example, the user of client device 108 selected a television that the user wants to purchase on the application located on client device 108. In another embodiment, client device 108 may store browser history for items that were searched on client device 108.

In the depicted environment, cognitive server 110 is one or more of a management server, a web server, or any other electronic device or computing system capable of receiving, analyzing, and sending data. In other embodiments, cognitive server 110 represents a server computing system utilizing multiple computers as a server system, such as in a cloud computing environment. In another embodiment, cognitive server 110 represents a laptop computer, a tablet computer, a netbook computer, a personal computer (PC), a desktop computer, a personal digital assistant (PDA), a smart phone, or any programmable electronic device capable of communicating with Csys server via network 114. In another embodiment, cognitive server 110 represents a computing system utilizing clustered computers and components to act as a single pool of seamless resources. Cognitive server 110 is a cognitive computing device which learns by experience and/or instruction. Cognitive server 110 learns and remembers how to adapt cognitive server 110's content displays, by situation, to influence behavior. In one example cognitive server 110 uses natural language processing to understand audio and create an appropriate response. Cognitive server 110 includes database 140. In another embodiment, cognitive server 110 may be located on or within Csys server 102, or cognitive server 110 may be directly linked with Csys server 102.

In the depicted embodiment, database 140 resides on cognitive server 110. In another embodiment, database 140 may reside elsewhere in distributed data processing environment 100, such as within Csys server 102, or independently as a standalone database that is capable of communicating with Csys server 102 and/or cognitive server 110 via network 112. A database is an organized collection of data. Database 140 is implemented with any type of storage device capable of storing data that is accessed and utilized by Csys server 102 and cognitive server 110, such as a database server, a hard disk drive, or a flash memory. In other embodiments, database 140 represents multiple storage devices within cognitive server 110. Database 140 stores information, such as company personnel directories and expertise, past questions and answers, inventories, planograms (location of products in a store), client preferences, digital shopping carts, etc.

Figure 2:
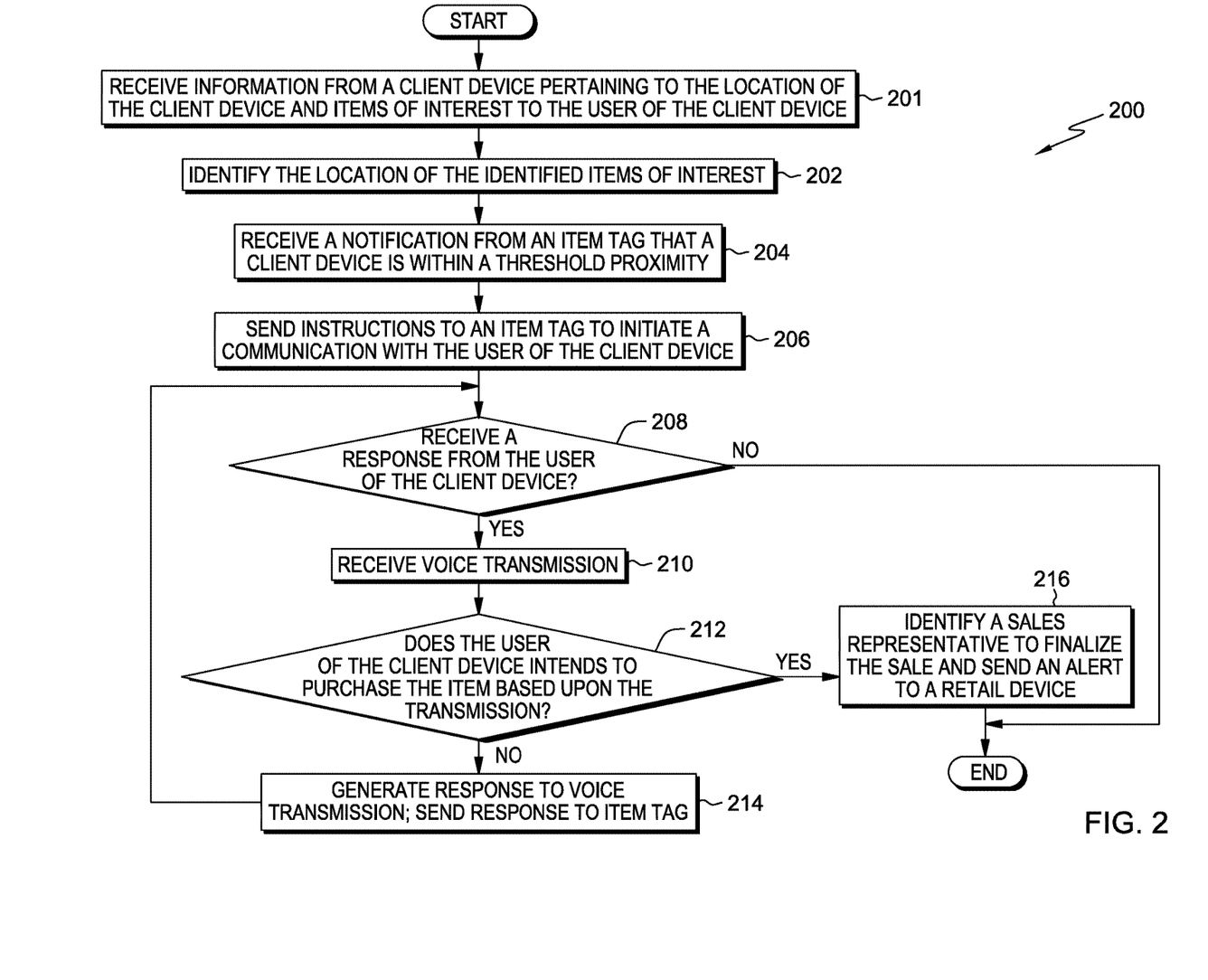
FIG. 2 is a flowchart depicting operational steps of a program for determining the likelihood of a customer purchase via a two way communication, and determining an appropriate sales representative for assisting the customer purchase within the distributed data processing environment of FIG. 1, in accordance with an embodiment of the present invention.

FIG. 2 is a flowchart depicting operational steps of program 200, which is a function of retail program 120, in accordance with an embodiment of the present invention. Retail program 120 operates on Csys server 102 and determines the likelihood of a customer to purchase an item via a two way communication between the user of client device 108 and item tag 130. Retail program 120 also determines an appropriate sales representative to assist in the completion of the purchase of the item. In one embodiment, retail program 120 initiates in response to client device 108 connecting to an onsite wireless network that is linked to Csys server 102. In another embodiment, Csys server 102 may receive a notification from client device 108 that client device 108 is now located in the proximity of a store managed by Csys server 102. In yet another embodiment, retail program 120 may track the location of client devices (e.g., client device 108), where each client device has an application allowing the user to create a shopping list, or other means known in the art, and initiate the operational steps of retail program 120 when the client device is located within a proximity of the store. For example, the user of client device 108 has created a wish list at XYZ's website; Csys server 102 monitors the location of client device 108 via the GPS (global positioning system) location of client device 108. When client device 108 is within a 100 feet of XYZ's store, retail program 120 begins the operational steps of retail program 120.

Retail program 120 receives information from a client device pertaining to the location of the client device and items of interest to the user of the client device (step 201). In one embodiment, retail program 120 receives information from a client device (e.g., client device 108) indicating items that are of interest to the user of the client device, and that the client device (e.g., client device 108) is in a location of interest via network 112. In an example, retail program 120 determines that the location of client device 108 is of interest when client device 108 connects to the wireless internet at a location of interest, such as client device 108 connecting to wireless internet at a retail store that utilizes retail program 120. In another example, retail program 120 may monitor GPS locations of client devices to determine when a client device is within a threshold proximity to a location of interest. In one embodiment, a user of client device 108 may check into a location of interest, which may alert retail program 120. Retail program 120 may also identify the location of a client device by any other method known in the art.

In an embodiment, retail program 120 identifies items that the user of client device 108 may be interested in and that are located in a store that utilizes retail program 120. In an example, the user of client device 108 creates a wish list (i.e., selected items in an online shopping cart) for items located in the store that retail program 120 identifies as being of interest to the user. In another example, retail program 120 identifies items that may be of interest by reviewing the search history, data, cookies, etc. of client device 108. In yet another example, retail program 120 identifies items that may be of interest by receiving a list of items from a client version of the application which is located on client device 108 (not depicted) that allows users of client device 108 to select specific items of interest. In one embodiment, retail program 120 receives personal information regarding the user of the client device, such as name, address, technical background, gender, age, questions the user may have regarding specific devices, the size of the living quarter of the user, the likes and dislikes of the user, etc.

Retail program 120 identifies the location of the items of the identified items of interest (step 202). In one embodiment, retail program 120 identifies the location of the identified item of interested to a user of client device 108 by searching database 140 for the physical location of the item in the store in the store, such as item 104. In an example, database 140 stores the location of each item in a store. In this example, retail program 120 may flag the items of interest or the location of the items, or it may send information to item tag 130 that client device 108 is in the store and may come within a threshold proximity.

Retail program 120 receives a notification from an item tag that a client device is within a threshold proximity (step 204). In one embodiment, retail program 120 receives a notification from item tag 130 that client device 108 is within a threshold proximity of item tag 130. For example, a threshold proximity can be a client device that is within a preset 5 foot distance of an item tag. Retail program 120 determines that the client device is within the threshold because the user of a client device would be able to hear the speakers of the item tag or item. The item tag may be alerted to the presence of the client device via a wireless receiver on the item tag. In another embodiment, retail program 120 may know that client device 108 is within a threshold proximity of item tag 130 by tracking the location client device 108 within the store via cameras, heat signatures, or other tracking methods known by someone skilled in the art. In one embodiment, retail program 120 may constantly receive the GPS location of client device 108, while client device 108 is connected to the retail locations wireless signal.

In another embodiment, retail program 120 tracks the location of the client device within the store to determine if the client device is within a proximity of an identified item of interest (and an item tag corresponding to the item). In an example, the store may utilize cameras or other tracking systems known in the art that can determine the location of client device 108. By using a planogram (a map of the store and the items for sale within the store), retail program 120 can determine when client device 108 is within a threshold proximity to an item. In one embodiment, the threshold proximity may be preset by a user of retail program 120 or item tag 130. In an example, a user of item tag 130 sets the threshold proximity between item tag 130 and client device 108 at seven (7) feet, because the user of client device 108 is within an audible range for the microphone and speakers of item tag 130. In one embodiment, the item tags for the identified items of interest from step 202 are alerted. An item tag can then determine when a client device that has the item tag preregistered to be of interest is within a threshold proximity with a radio-frequency identification (RFID) reader. In another embodiment, item tag 130 may determine the user of client device (e.g., client device 108) is within a threshold proximity by tracking a smart card carried by the user of the client device (e.g., client device 108). In various examples, the smart card may or may not be given out by the store to customers.

Retail program 120 sends instructions to an item tag to initiate a communication with the user of the client device (step 206). In an embodiment, retail program 120 sends instructions to item tag 130 to initiate communication with the user of client device 108. In an example, retail program 120 sends instructions to item tag 130 to begin a conversation with the user of client device 108 and to communicate the specifications of item 104 which are of interest to the user of client device 108, such as dimensions, price, warranty, consumer rating, etc. In another example, retail program 120 may just send a simple greeting to the user of client device 108, such as "hello" and the name of the user of client device 108, if the name of the user is known. In an embodiment, retail program 120 has a preset greeting to send to a user of client device 108. In one example, when item tag 130 is turned on, it sends the specifications of the item that item tag 130 is attached to, such as item 104, which are then stored in a database, such as database 140. When a client device enters a threshold proximity, retail program 120 sends instructions to item tag 130 to communicate the specifications of the item that are stored in database 140. In another embodiment, retail program 120 determines the name and gender of the user of client device 108 by locating log-in credentials. In one embodiment, retail program 120 sends the specifications of the item, such as item 104, to the item tag, such as item tag 130, as well as a list of generated questions based upon the user of the client device's (e.g., client device 108) preferences or other personal information as soon as the user of the client device (e.g., client device 108) enters the premises of the location. In one example, retail program 120 sends instructions to the item tag with a list of questions and/or answers based upon previous search criteria, posed questions, and/or information on the client device pertaining to the item (e.g., size of the living room as compared to the size of a television). In one embodiment, retail program 120 may select which item tags to send information on based upon the preferences of the user of client device 108.

Retail program 120 determines if retail program 120 receives a response from the user of the client device via the item tag (decision 208). In an embodiment, retail program 120 determines whether a response is received from the greeting to the user of client device 108 (in step 206). In an example, the user of client device 108 does not respond to the greeting in step 206 and, therefore, retail program 120 does not receive a response or transmission from item tag 130 (no branch, decision 208). In this example, when retail program 120 does not receive a response, retail program 120 ends. In an embodiment, retail program 120 may determine that retail program 120 has not received a response if a preselected amount of time has passed between a communication by item tag 130 and the user of client device 108, such as 30 seconds, or client device 108 has moved out of the proximity threshold of item tag 130. In an embodiment, the amount of time to pass to determine if a user of the client device has not responded may be determined based on the question or comment posed by item tag 130, as some questions may take a longer amount of time for a user of client device 108 to formulate a response. In another embodiment (not depicted), retail program 120 may skip to step 216 if retail program 120 does not receive a response. In one embodiment, if retail program 120 does not receive a response from the user of client device 108 within 20 seconds, and client device 108 is still within a threshold proximity of client device 108, then retail program 120 may send the previously generated statement to item tag 130 to be communicated by item tag 130.

Retail program 120 receives a voice transmission (step 210). In an embodiment, retail program 120 receives a response from a user of client device 108 via a microphone located on item tag 130 (yes branch, decision 208). In an example, the user of client device 108 responds to the transmission of item tag 130 by speaking to the item (e.g., item 104) or item tag and stating that the user of client device 108 would like to know if item 104 is wireless enabled. In this example, item tag 130 sends the voice transmission of the question to retail program 120, which receives the voice transmission via network 112. In another example, retail program 120 may receive video, lines of text, or any other communication method of combination thereof.

Retail program 120 determines if the user of the client device intends to purchase the item based upon the transmission (decision 212). In an embodiment, retail program 120 uses natural language processing and cognitive computing to determine if the user of client device 108 will purchase item 104 based upon the voice transmission from step 210 and any other previous interactions with item tag 130. In an example, retail program 120 determines that the user of client device 108 will not purchase item 104 because the user of client device 108 has only posed questions regarding the specifications of the item (no branch, decision 212). In an example, retail program 120 has received five voice transmissions from the user of client device 108 and reviews all of the transmissions each time to determine if the user of client device 108 will purchase the item. In this example, retail program 120 determines there have been no questions alluding to price, purchase, help, retail assistants, sales representative, etc., but rather that the user of client device 108 is still trying to gather information pertaining to item 104. In an embodiment, retail program 120 searches for keywords, such as sales person, representative, purchase, etc. to determine if the user of client device 108 is likely to purchase the device. In an example, the user of client device 108 states, "I would like to purchase the item." Retail program 120 identifies keywords "purchase" and "item" and determines that the user of client device 108 intends to purchase the item. In another embodiment, retail program 120 utilizes natural language processing and latent Dirichlet allocation (LDA) to determine a probability percentage that the user of client device 108 is going to purchase the item (e.g., item 104). In an example, if retail program 120 determines that there is greater than an 85% chance of a purchase, then retail program 120 proceeds to step 216. Retail program 120 may also utilize any other method known by one skilled in the art to determine the probability of a purchase.

Retail program 120 generates a response to the voice transmission and sends the response to the item tag (step 214). In an embodiment, in response to determining that the user of the client device will not purchase the item based upon the transmission (no branch, decision 212), retail program 120 generates a response to the received voice transmission in step 210. In an example, retail program 120 generates a response to the voice transmission of the user of client device 108 by using natural language processing and cognitive computing. To continue the example, retail program 120 then converts the audio to text by using speech recognition or other methods known in the art. Then, by utilizing natural language processing or other methods known in the art, retail program 120 can break the sentence down to determine the subject of the question and create an appropriate response, either through preset answers or learned behavior using cognitive computing. Retail program 120 then sends the response to item tag 130. In this example, the received voice transmission may have posed a question as to whether item 104 was wireless enabled. Retail program 120 determines that item 104 is wireless enabled and generates a response stating that item 104 is wireless enabled. Retail program 120 then sends the response to item tag 130, which transmits the response via a speaker, digital display etc. When retail program 120 sends a response to item tag 130, retail program 120 returns to step 208. In another embodiment, Csys server 102 is not capable of cognitive computing and retail program 120 sends the voice transmission, any previous voice transmission, and any specification regarding item 104 to cognitive server 110, which is capable of cognitive computing and natural language processing. In this embodiment, retail program 120 then receives the generated response from cognitive server 110 and sends the response to item tag 130.

If retail program 120 determines that the user of a client device intends to purchase the item based upon a transmission from the client device (yes branch, decisions 212), then retail program 120 identifies an appropriate sales representative to finalize the sale and sends an alert to a retail device (step 216). In an embodiment, retail program 120 has determined that the user of client device 108 wants to purchase item 104 and sends an alert to retail device 106. In an example, retail program 120 determines that the user of client device 108 would like to purchase item 104, but the user had many questions regarding wireless capabilities with regard to item 104. In this example, retail program 120 utilizes a company directory located in database 140 to identify the most qualified retail/sales representative to finalize the sale of item 104. Retail program 120 determines that one particular sales representative is extremely learned in wireless connectivity, because the company directory has a list of specialties for each employee. Retail program 120 then sends an alert to the identified sales representative via retail device 106. The alert may include all communication between the user of client device 108 and item tag 130. The alert may also include a list of questions or topics that the sales representative can utilize to finalize the sale. The communications may be in audio, text, or any other medium known in the art that a retail representative can understand. In one example, each sales representative may have their own retail device, such as a cell phone, ear bud, pager, etc., and retail program 120 may send an alert to the specific user of the retail device. In another example, there may only be one retail device, such as a desktop computer. In another embodiment, a server alert program may select the closest retail representative to client device 108 to send an alert. In yet another embodiment, no information regarding the previous transmissions may be given in the alert.

Figure 3:
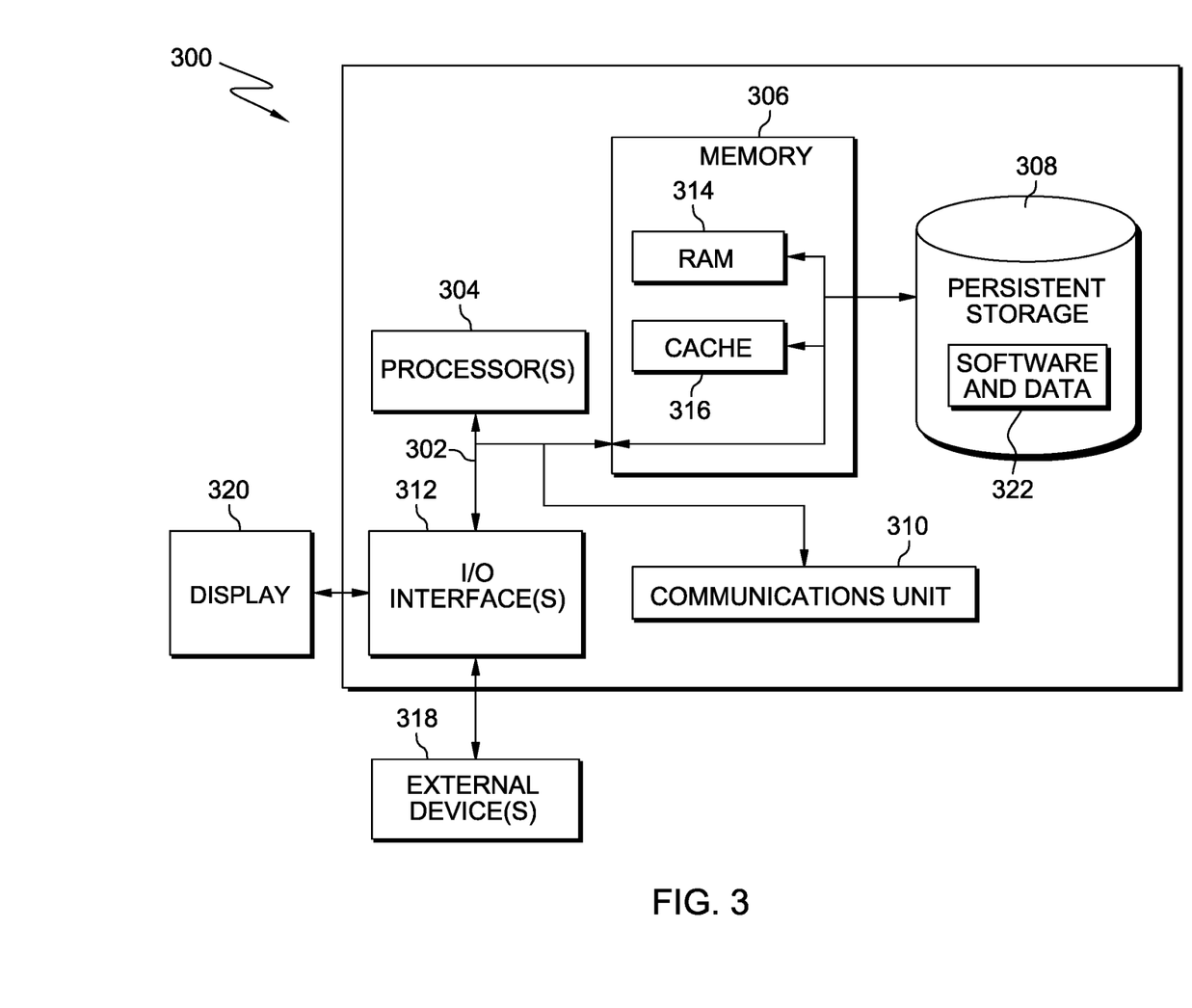
FIG. 3 depicts a block diagram of components of a Centralized System (Csys) Server, and a cognitive server of FIG. 1, in accordance with an embodiment of the present invention.

FIG. 3 depicts a block diagram of components of computer 300, which is representative of Csys server 102, and cognitive server 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media. Software and data 322 are stored in persistent storage 308 for access and/or execution by processor(s) 304 via one or more memories of memory 306. With respect to server 102, software and data 322 represents retail program 120. With respect to cognitive server 110, software and data 322 represents database 140.

In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface(s) 312 may provide a connection to external device(s) 318 such as a keyboard, a keypad, a touch screen, and/or some other suitable input device. External device(s) 318 can also include portable computer readable storage media such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

identifying, by one or more computer processors, one or more items searched for by a user on a client device;

determining, by one or more computer processors, if a location of the client device is within a threshold distance of an item of the one or more searched items;

in response to determining that the client device is within the threshold distance, generating, by one or more computer processors, a two way communication to the user of the client device presented from and received by a hardware tag attached to the item of the one or more searched items, wherein the two way communication includes specification details about the item and at least a question directed to the user of the client device;

determining, by one or more computer processors, if a received response from the user to the generated two way communication indicates a request for additional information about the item; and in response to determining that the received response indicates the request for additional information about the item, identifying from personnel directories, by one or more computer processors, an appropriate representative having a skill set to assist the user.

2. The method of claim 1, wherein said identifying the sales representative comprises:

identifying, by one or more computer processors, an item type corresponding to the item; and determining, by one or more computer processors, that the appropriate representative has a specialization that is associated with the identified item.

3. The method of claim 1, further comprising:
in response to determining that the received response does not indicate that the user intends to purchase the item, generating, by one or more computer processors, a response to send to the user of the client device that includes additional information regarding the item.

4. The method of claim 1, wherein the received response comprises a transmission from a device that is associated with the item.

5. The method of claim 1, wherein said generating the communication comprises:
identifying, by one or more computer processors, information on the client device pertaining to the item;
identifying, by one or more computer processors, specifications pertaining to the item; and
generating, by one or more computer processors, the communication based upon one or both of the identified information and the identified specifications pertaining to the item.

6. The method of claim 1, wherein said determining, by the one or more processors, if the received response from the user to the generated two-way communication indicates a request for additional information about the item, further comprises:
identifying, by one or more computer processors, key words in the reply; and
determining, by one or more computer processors, if the identified key words indicate an intent to purchase the item.

7. The method of claim 1, wherein the received response comprises a voice transmission from the user.

8. The method of claim 1 wherein said identifying one or more items searched for by a user on a client device comprises:
identifying, by one or more computer processors, one or more items of interest to the user based on one or more of a shopping list on the client device or a previous search history on the client device;
identifying, by one or more computer processors, a store associated with the location of the client device; and
searching, by one or more computer processors, an inventory of the store to determine if one or more items of interest to the user are located within the store.

9. The method of claim 1, wherein said determining if a location of the client device is within a threshold distance of an item of the one or more searched items comprises:
identifying, by one or more computer processors, the location of each of the one or more searched items in the store; and
determining, by one or more computer processors, if the location of the client device is within a threshold location of the item based upon a planogram of the store and tracking the location of the client device via cameras.

10. The method of claim 1, wherein said generating a communication that the item of the one or more searched items presents to the user of the client device comprises:
sending, by one or more computer processors, the generated communication to the item to be disseminated as audio by the item.

11. The method of claim 1, wherein the communication presented to the user of the client device includes presenting an audible communication by the hardware tag attached to the item of the one or more searched items.

12. A computer program product comprising:
one or more computer readable storage media and program instructions stored on the one or more computer readable storage media, the stored program instructions comprising:
program instructions to identify one or more items searched for by a user on a client device;
program instructions to determine if a location of the client device is within a threshold distance of an item of the one or more searched items;
program instructions to, in response to determining that the client device is within the threshold distance, generate a two way communication to the user of the client device presented from and received by a hardware tag attached to the item of the one or more searched items, wherein the two way communication includes specification details about the item and at least a question directed to the user of the client device;
program instructions to determine if a received response from the user to the generated two way communication indicates a request for additional information about the item; and
program instructions to, in response to determining that the received response indicates the request for additional information about the item, identify from personnel directories an appropriate representative from personnel directories having a skill set to assist the user.

13. The computer program product of claim 12, further comprising program instructions, stored on the one or more computer readable storage media, to:
in response to determining that the received response does not indicate that the user intends to purchase the item, generate a response to send to the user of the client device that includes additional information regarding the item.

14. The computer program product of claim 12, wherein the program instructions to generate the communication comprise program instructions to:
identify information on the client device pertaining to the item;
identify specifications pertaining to the item; and
generate the communication based upon one or both of the identified information and the identified specifications pertaining to the item.

15. The computer program product of claim 12, wherein the program instructions to identify one or more items searched for by a user on a client device comprise program instructions to:
identify one or more items of interest to the user based on one or more of a shopping list on the client device or a previous search history on the client device;
identify a store associated with the location of the client device; and
search an inventory of the store to determine if one or more items of interest to the user are located within the store.

16. A computer system comprising:
one or more computer processors;
one or more computer readable storage media;
program instructions stored on the computer readable storage media for execution by at least one of the one or more computer processors, the stored program instructions comprising:
program instructions to identify one or more items searched for by a user on a client device;

program instructions to determine if a location of the client device is within a threshold distance of an item of the one or more searched items;

program instructions to, in response to determining that the client device is within the threshold distance, generate a two way communication to the user of the client device presented from and received by a hardware tag attached to the item of the one or more searched items, wherein the two way communication includes specification details about the item and personalized information about the user;

program instructions to determine if a received response from the user to the generated two way communication indicates a request for additional information about the item; and program instructions to, in response to determining that the received response indicates the request for additional information about the item, identify from personnel directories an appropriate representative having a skill set to assist the user.

17. The computer system of claim 16, further comprising program instructions, stored on the computer readable storage media for execution by at least one of the one or more processors, to:

in response to determining that the received response does not indicate that the user intends to purchase the item, generate a response to send to the user of the client device that includes additional information regarding the item.

18. The computer system of claim 16, wherein the program instructions to generate the communication comprise program instructions to:

identify information on the client device pertaining to the item;

identify specifications pertaining to the item; and generate the communication based upon one or both of the identified information and the identified specifications pertaining to the item.

19. The computer system of claim 16, wherein the program instructions to identify one or more items searched for by a user on a client device comprise program instructions to:

identify one or more items of interest to the user based on one or more of a shopping list on the client device or a previous search history on the client device;

identify a store associated with the location of the client device; and search an inventory of the store to determine if one or more items of interest to the user are located within the store.

20. The computer system of claim 16, wherein the program instructions in which the communication presented to the user of the client device includes program instructions for presenting an audible communication by the hardware tag attached to the item of the one or more searched items.

* * * * *